(12) United States Patent
Hinman

(10) Patent No.: US 11,251,539 B2
(45) Date of Patent: Feb. 15, 2022

(54) MULTI-BAND ACCESS POINT ANTENNA ARRAY

(71) Applicant: AIRSPAN IP HOLDCO LLC, Boca Raton, FL (US)

(72) Inventor: Brian L. Hinman, Los Gatos, CA (US)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 196 days.

(21) Appl. No.: 15/658,324

(22) Filed: Jul. 24, 2017

(65) Prior Publication Data

US 2018/0034166 A1 Feb. 1, 2018

Related U.S. Application Data

(60) Provisional application No. 62/368,946, filed on Jul. 29, 2016.

(51) Int. Cl.
*H01Q 21/28* (2006.01)
*H01Q 21/20* (2006.01)
(Continued)

(52) U.S. Cl.
CPC ............ *H01Q 21/28* (2013.01); *H01Q 1/007* (2013.01); *H01Q 1/2291* (2013.01); *H01Q 1/48* (2013.01); *H01Q 5/30* (2015.01); *H01Q 5/40* (2015.01); *H01Q 9/0407* (2013.01); *H01Q 21/08* (2013.01); *H01Q 21/205* (2013.01); *H01Q 21/24* (2013.01); *H01Q 1/246* (2013.01); *H04B 1/38* (2013.01); *H04B 7/0413* (2013.01); *H04B 7/0617* (2013.01)

(58) Field of Classification Search
CPC .......... H01Q 1/246; H01Q 21/28; H01Q 5/30; H01Q 1/48
See application file for complete search history.

(56) References Cited

U.S. PATENT DOCUMENTS

| 2,735,993 A | 2/1956 | Humphrey |
| 3,182,129 A | 5/1965 | Clark et al. |

(Continued)

FOREIGN PATENT DOCUMENTS

| CN | 104335654 A | 2/2015 |
| CN | 303453662 S | 11/2015 |

(Continued)

OTHER PUBLICATIONS

Dowla, Farid, et al. RF and Wireless Technologies: Know It All. Netherlands, Elsevier Science, 2008, p. 314. (Year: 2008).*

(Continued)

*Primary Examiner* — Dameon E Levi
*Assistant Examiner* — Jennifer F Hu
(74) *Attorney, Agent, or Firm* — Carr & Ferrell LLP

(57) ABSTRACT

Multi-band antenna arrays and methods of use are provided herein. An example device includes vertical surfaces arranged into a tubular configuration, where each of the vertical surfaces comprising antenna arrays is aligned along the vertical surfaces. The antenna elements are arrayed through a feed network in such a way that antenna gain is increased while elevation beam-width is reduced. The device also includes two or more radios connected to the antenna arrays on the vertical surfaces via the feed network.

20 Claims, 6 Drawing Sheets

(51) Int. Cl.
| | | |
|---|---|---|
| *H01Q 1/00* | (2006.01) | |
| *H01Q 1/22* | (2006.01) | |
| *H01Q 9/04* | (2006.01) | |
| *H01Q 21/08* | (2006.01) | |
| *H01Q 5/40* | (2015.01) | |
| *H01Q 21/24* | (2006.01) | |
| *H01Q 5/30* | (2015.01) | |
| *H01Q 1/48* | (2006.01) | |
| *H04B 7/06* | (2006.01) | |
| *H01Q 1/24* | (2006.01) | |
| *H04B 1/38* | (2015.01) | |
| *H04B 7/0413* | (2017.01) | |

(56) References Cited

U.S. PATENT DOCUMENTS

| | | |
|---|---|---|
| D227,476 S | 6/1973 | Kennedy |
| 4,188,633 A | 2/1980 | Frazita |
| 4,402,566 A | 9/1983 | Powell et al. |
| D273,111 S | 3/1984 | Hirata et al. |
| 4,543,579 A | 9/1985 | Teshirogi |
| 4,562,416 A | 12/1985 | Sedivec |
| 4,626,863 A | 12/1986 | Knop et al. |
| 4,835,538 A | 5/1989 | McKenna et al. |
| 4,866,451 A | 9/1989 | Chen |
| 4,893,288 A | 1/1990 | Maier et al. |
| 4,903,033 A | 2/1990 | Tsao et al. |
| 4,986,764 A | 1/1991 | Eaby et al. |
| 5,015,195 A | 5/1991 | Piriz |
| 5,087,920 A | 2/1992 | Tsurumaru et al. |
| 5,226,837 A | 7/1993 | Cinibulk et al. |
| 5,231,406 A | 7/1993 | Sreenivas |
| D346,598 S | 5/1994 | McCay et al. |
| D355,416 S | 2/1995 | McCay et al. |
| 5,389,941 A | 2/1995 | Yu |
| 5,491,833 A | 2/1996 | Hamabe |
| 5,513,380 A | 4/1996 | Ivanov et al. |
| 5,539,361 A | 7/1996 | Davidovitz |
| 5,561,434 A | 10/1996 | Yamazaki |
| D375,501 S | 11/1996 | Lee et al. |
| 5,580,264 A | 12/1996 | Aoyama et al. |
| 5,684,495 A | 11/1997 | Dyott et al. |
| D389,575 S | 1/1998 | Grasfield et al. |
| 5,724,666 A | 3/1998 | Dent |
| 5,742,911 A | 4/1998 | Dumbrill et al. |
| 5,746,611 A | 5/1998 | Brown et al. |
| 5,764,696 A | 6/1998 | Barnes et al. |
| 5,797,083 A | 8/1998 | Anderson |
| 5,831,582 A | 11/1998 | Muhlhauser et al. |
| 5,966,102 A | 10/1999 | Runyon |
| 5,995,063 A * | 11/1999 | Somoza .................. H01Q 1/246 343/874 |
| 6,014,372 A | 1/2000 | Kent et al. |
| 6,067,053 A | 5/2000 | Runyon et al. |
| 6,137,449 A | 10/2000 | Kildal |
| 6,140,962 A | 10/2000 | Groenenboom |
| 6,176,739 B1 | 1/2001 | Denlinger et al. |
| 6,216,266 B1 | 4/2001 | Eastman et al. |
| 6,271,802 B1 | 8/2001 | Clark et al. |
| 6,304,762 B1 | 10/2001 | Myers et al. |
| D455,735 S | 4/2002 | Winslow |
| 6,421,538 B1 | 7/2002 | Byrne |
| 6,716,063 B1 | 4/2004 | Bryant et al. |
| 6,754,511 B1 | 6/2004 | Halford et al. |
| 6,847,653 B1 | 1/2005 | Smiroldo |
| D501,848 S | 2/2005 | Uehara et al. |
| 6,853,336 B2 | 2/2005 | Asano et al. |
| 6,864,837 B2 * | 3/2005 | Runyon .................. H01Q 1/246 342/372 |
| 6,877,277 B2 | 4/2005 | Kussel et al. |
| 6,962,445 B2 | 11/2005 | Zimmel et al. |
| 7,075,492 B1 | 7/2006 | Chen et al. |
| D533,899 S | 12/2006 | Ohashi et al. |
| 7,173,570 B1 | 2/2007 | Wensink et al. |
| 7,187,328 B2 | 3/2007 | Tanaka et al. |
| 7,193,562 B2 | 3/2007 | Shtrom et al. |
| 7,212,162 B2 | 5/2007 | Jung et al. |
| 7,212,163 B2 | 5/2007 | Huang et al. |
| 7,245,265 B2 | 7/2007 | Kienzle et al. |
| 7,253,783 B2 | 8/2007 | Chiang et al. |
| 7,264,494 B2 | 9/2007 | Kennedy et al. |
| 7,281,856 B2 | 10/2007 | Grzegorzewska et al. |
| 7,292,198 B2 | 11/2007 | Shtrom et al. |
| 7,306,485 B2 | 12/2007 | Masuzaki |
| 7,316,583 B1 | 1/2008 | Mistarz |
| 7,324,057 B2 | 1/2008 | Argaman et al. |
| D566,698 S | 4/2008 | Choi et al. |
| 7,362,236 B2 | 4/2008 | Hoiness |
| 7,369,095 B2 | 5/2008 | Hirtzlin et al. |
| 7,380,984 B2 | 6/2008 | Wuester |
| 7,431,602 B2 | 10/2008 | Corona |
| 7,436,373 B1 * | 10/2008 | Lopes .................. H01Q 1/20 343/700 MS |
| 7,498,896 B2 | 3/2009 | Shi |
| 7,498,996 B2 | 3/2009 | Shtrom et al. |
| 7,507,105 B1 | 3/2009 | Peters et al. |
| 7,522,095 B1 | 4/2009 | Wasiewicz et al. |
| 7,542,717 B2 | 6/2009 | Green, Sr. et al. |
| 7,581,976 B2 | 9/2009 | Liepold et al. |
| 7,586,891 B1 | 9/2009 | Masciulli |
| 7,616,959 B2 | 11/2009 | Spenik et al. |
| 7,646,343 B2 | 1/2010 | Shtrom et al. |
| 7,675,473 B2 | 3/2010 | Kienzle et al. |
| 7,675,474 B2 | 3/2010 | Shtrom et al. |
| 7,726,997 B2 | 6/2010 | Kennedy et al. |
| 7,778,226 B2 | 8/2010 | Rayzman et al. |
| 7,857,523 B2 | 12/2010 | Masuzaki |
| 7,929,914 B2 | 4/2011 | Tegreene |
| RE42,522 E | 7/2011 | Zimmel et al. |
| 8,009,646 B2 | 8/2011 | Lastinger et al. |
| 8,069,465 B1 | 11/2011 | Bartholomay et al. |
| 8,111,678 B2 | 2/2012 | Lastinger et al. |
| 8,254,844 B2 | 8/2012 | Kuffner et al. |
| 8,270,383 B2 | 9/2012 | Lastinger et al. |
| 8,275,265 B2 * | 9/2012 | Kobyakov ............ H04W 48/20 398/115 |
| 8,325,695 B2 | 12/2012 | Lastinger et al. |
| 8,339,327 B2 | 12/2012 | Schadler et al. |
| D674,787 S | 1/2013 | Tsuda et al. |
| 8,345,651 B2 | 1/2013 | Lastinger et al. |
| 8,385,305 B1 | 2/2013 | Negus et al. |
| 8,425,260 B2 | 4/2013 | Seefried et al. |
| 8,482,478 B2 | 7/2013 | Hartenstein |
| 8,515,434 B1 | 8/2013 | Narendran et al. |
| 8,515,495 B2 | 8/2013 | Shang et al. |
| D694,740 S | 12/2013 | Apostolakis |
| 8,777,660 B2 | 7/2014 | Chiarelli et al. |
| 8,792,759 B2 | 7/2014 | Benton et al. |
| 8,827,729 B2 | 9/2014 | Gunreben et al. |
| 8,836,601 B2 | 9/2014 | Sanford et al. |
| 8,848,389 B2 | 9/2014 | Kawamura et al. |
| 8,870,069 B2 | 10/2014 | Bellows |
| 8,872,715 B2 | 10/2014 | Lea et al. |
| 8,935,122 B2 | 1/2015 | Stisser |
| 9,001,689 B1 | 4/2015 | Hinman et al. |
| 9,019,874 B2 | 4/2015 | Choudhury et al. |
| 9,077,071 B2 | 7/2015 | Shtrom et al. |
| 9,107,134 B1 | 8/2015 | Belser et al. |
| 9,130,305 B2 | 9/2015 | Ramos et al. |
| 9,161,387 B2 | 10/2015 | Fink et al. |
| 9,179,336 B2 | 11/2015 | Fink et al. |
| 9,191,081 B2 | 11/2015 | Hinman et al. |
| D752,566 S | 3/2016 | Hinman et al. |
| 9,295,103 B2 | 3/2016 | Fink et al. |
| 9,362,629 B2 | 6/2016 | Hinman et al. |
| 9,391,375 B1 | 7/2016 | Bales et al. |
| 9,407,012 B2 | 8/2016 | Shtrom et al. |
| 9,431,702 B2 | 8/2016 | Hartenstein |
| 9,504,049 B2 | 11/2016 | Hinman et al. |
| 9,531,114 B2 | 12/2016 | Ramos et al. |
| 9,537,204 B2 | 1/2017 | Cheng et al. |
| 9,577,340 B2 | 2/2017 | Fakharzadeh et al. |
| 9,693,388 B2 | 6/2017 | Fink et al. |

(56) References Cited

U.S. PATENT DOCUMENTS

| | | |
|---|---|---|
| 9,780,892 B2 | 10/2017 | Hinman et al. |
| 9,843,940 B2 | 12/2017 | Hinman et al. |
| 9,871,302 B2 | 1/2018 | Hinman et al. |
| 9,888,485 B2 | 2/2018 | Hinman et al. |
| 9,930,592 B2 | 3/2018 | Hinman |
| 9,949,147 B2 | 4/2018 | Hinman et al. |
| 9,986,565 B2 | 5/2018 | Fink et al. |
| 9,998,246 B2 | 6/2018 | Hinman et al. |
| 10,028,154 B2* | 7/2018 | Elson ............... H01Q 21/08 |
| 10,090,943 B2 | 10/2018 | Hinman et al. |
| 10,096,933 B2 | 10/2018 | Ramos et al. |
| 10,117,114 B2 | 10/2018 | Hinman et al. |
| 10,186,786 B2 | 1/2019 | Hinman et al. |
| 10,200,925 B2 | 2/2019 | Hinman |
| 10,257,722 B2 | 4/2019 | Hinman et al. |
| 10,425,944 B2 | 9/2019 | Fink et al. |
| 10,447,417 B2 | 10/2019 | Hinman et al. |
| 10,511,074 B2 | 12/2019 | Eberhardt et al. |
| 10,595,253 B2 | 3/2020 | Hinman |
| 10,616,903 B2 | 4/2020 | Hinman et al. |
| 10,714,805 B2 | 7/2020 | Eberhardt et al. |
| 10,742,275 B2 | 8/2020 | Hinman |
| 10,749,263 B2 | 8/2020 | Eberhardt et al. |
| 10,785,608 B2 | 9/2020 | Fink et al. |
| 10,790,613 B2 | 9/2020 | Ramos et al. |
| 10,812,994 B2 | 10/2020 | Hinman et al. |
| 10,863,507 B2 | 12/2020 | Fink et al. |
| 10,938,110 B2 | 3/2021 | Hinman et al. |
| 10,958,332 B2 | 3/2021 | Hinman et al. |
| 11,069,986 B2 | 7/2021 | Sanford et al. |
| 2001/0033600 A1 | 10/2001 | Yang et al. |
| 2002/0102948 A1 | 8/2002 | Stanwood et al. |
| 2002/0159434 A1 | 10/2002 | Gosior et al. |
| 2003/0013452 A1 | 1/2003 | Hunt et al. |
| 2003/0027577 A1 | 2/2003 | Brown et al. |
| 2003/0169763 A1 | 9/2003 | Choi et al. |
| 2003/0222831 A1 | 12/2003 | Dunlap |
| 2003/0224741 A1 | 12/2003 | Sugar et al. |
| 2004/0002357 A1 | 1/2004 | Benveniste |
| 2004/0029549 A1 | 2/2004 | Fikart |
| 2004/0110469 A1 | 6/2004 | Judd et al. |
| 2004/0120277 A1 | 6/2004 | Holur et al. |
| 2004/0155819 A1* | 8/2004 | Martin ............... H04W 40/02 343/700 MS |
| 2004/0196812 A1 | 10/2004 | Barber |
| 2004/0196813 A1 | 10/2004 | Ofek et al. |
| 2004/0240376 A1 | 12/2004 | Wang et al. |
| 2004/0242274 A1 | 12/2004 | Corbett et al. |
| 2005/0012665 A1* | 1/2005 | Runyon ............... H01Q 1/246 342/372 |
| 2005/0032479 A1 | 2/2005 | Miller et al. |
| 2005/0058111 A1 | 3/2005 | Hung et al. |
| 2005/0124294 A1 | 6/2005 | Wentink |
| 2005/0141459 A1 | 6/2005 | Li et al. |
| 2005/0143014 A1 | 6/2005 | Li et al. |
| 2005/0152323 A1 | 7/2005 | Bonnassieux et al. |
| 2005/0195758 A1 | 9/2005 | Chitrapu |
| 2005/0227625 A1 | 10/2005 | Diener |
| 2005/0254442 A1 | 11/2005 | Proctor, Jr. et al. |
| 2005/0271056 A1 | 12/2005 | Kaneko |
| 2005/0275527 A1 | 12/2005 | Kates |
| 2006/0025072 A1 | 2/2006 | Pan |
| 2006/0072518 A1 | 4/2006 | Pan et al. |
| 2006/0098592 A1 | 5/2006 | Proctor, Jr. et al. |
| 2006/0099940 A1 | 5/2006 | Pfleging et al. |
| 2006/0132359 A1 | 6/2006 | Chang et al. |
| 2006/0132602 A1 | 6/2006 | Muto et al. |
| 2006/0172578 A1 | 8/2006 | Parsons |
| 2006/0187952 A1 | 8/2006 | Kappes et al. |
| 2006/0211430 A1 | 9/2006 | Persico |
| 2006/0276073 A1 | 12/2006 | McMurray et al. |
| 2007/0001910 A1 | 1/2007 | Yamanaka et al. |
| 2007/0019664 A1 | 1/2007 | Benveniste |
| 2007/0035463 A1 | 2/2007 | Hirabayashi |
| 2007/0060158 A1 | 3/2007 | Medepalli et al. |
| 2007/0132643 A1 | 6/2007 | Durham et al. |
| 2007/0173199 A1 | 7/2007 | Sinha |
| 2007/0173260 A1 | 7/2007 | Love et al. |
| 2007/0202809 A1 | 8/2007 | Lastinger et al. |
| 2007/0210974 A1 | 9/2007 | Chiang |
| 2007/0223701 A1 | 9/2007 | Emeott et al. |
| 2007/0238482 A1 | 10/2007 | Rayzman et al. |
| 2007/0255797 A1 | 11/2007 | Dunn et al. |
| 2007/0268848 A1 | 11/2007 | Khandekar et al. |
| 2008/0109051 A1 | 5/2008 | Splinter et al. |
| 2008/0112380 A1 | 5/2008 | Fischer |
| 2008/0192707 A1 | 8/2008 | Xhafa et al. |
| 2008/0218418 A1 | 9/2008 | Gillette |
| 2008/0231541 A1 | 9/2008 | Teshirogi et al. |
| 2008/0242342 A1 | 10/2008 | Rofougaran |
| 2009/0046673 A1 | 2/2009 | Kaidar |
| 2009/0051597 A1 | 2/2009 | Wen et al. |
| 2009/0052362 A1 | 2/2009 | Meier et al. |
| 2009/0059794 A1 | 3/2009 | Frei |
| 2009/0075606 A1 | 3/2009 | Shtrom et al. |
| 2009/0096699 A1 | 4/2009 | Chiu et al. |
| 2009/0232026 A1 | 9/2009 | Lu |
| 2009/0233475 A1 | 9/2009 | Mildon et al. |
| 2009/0291690 A1 | 11/2009 | Guvenc et al. |
| 2009/0315792 A1 | 12/2009 | Miyashita et al. |
| 2010/0029282 A1 | 2/2010 | Stamoulis et al. |
| 2010/0034191 A1 | 2/2010 | Schulz |
| 2010/0039340 A1 | 2/2010 | Brown |
| 2010/0046650 A1 | 2/2010 | Jongren et al. |
| 2010/0067505 A1 | 3/2010 | Fein et al. |
| 2010/0085950 A1 | 4/2010 | Sekiya et al. |
| 2010/0091818 A1 | 4/2010 | Sen et al. |
| 2010/0103065 A1 | 4/2010 | Shtrom et al. |
| 2010/0103066 A1 | 4/2010 | Shtrom et al. |
| 2010/0119002 A1* | 5/2010 | Hartenstein ......... H01Q 21/205 375/267 |
| 2010/0136978 A1 | 6/2010 | Cho et al. |
| 2010/0151877 A1 | 6/2010 | Lee et al. |
| 2010/0167719 A1 | 7/2010 | Sun et al. |
| 2010/0171665 A1 | 7/2010 | Nogami |
| 2010/0171675 A1 | 7/2010 | Borja et al. |
| 2010/0177660 A1 | 7/2010 | Essinger et al. |
| 2010/0189005 A1 | 7/2010 | Bertani et al. |
| 2010/0202613 A1 | 8/2010 | Ray et al. |
| 2010/0210147 A1 | 8/2010 | Hauser |
| 2010/0216412 A1 | 8/2010 | Rofougaran |
| 2010/0225529 A1 | 9/2010 | Landreth et al. |
| 2010/0238083 A1 | 9/2010 | Malasani |
| 2010/0304680 A1 | 12/2010 | Kuffner et al. |
| 2010/0311321 A1 | 12/2010 | Norin |
| 2010/0315307 A1 | 12/2010 | Syed et al. |
| 2010/0322219 A1 | 12/2010 | Fischer et al. |
| 2011/0006956 A1 | 1/2011 | McCown |
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0090129 A1 | 4/2011 | Weily et al. |
| 2011/0103309 A1 | 5/2011 | Wang et al. |
| 2011/0111715 A1 | 5/2011 | Buer et al. |
| 2011/0112717 A1 | 5/2011 | Resner |
| 2011/0133996 A1 | 6/2011 | Alapuranen |
| 2011/0170424 A1 | 7/2011 | Safavi |
| 2011/0172916 A1 | 7/2011 | Pakzad et al. |
| 2011/0182260 A1 | 7/2011 | Sivakumar et al. |
| 2011/0182277 A1 | 7/2011 | Shapira |
| 2011/0194644 A1 | 8/2011 | Liu et al. |
| 2011/0206012 A1 | 8/2011 | Youn et al. |
| 2011/0241969 A1 | 10/2011 | Zhang et al. |
| 2011/0243291 A1 | 10/2011 | McAllister et al. |
| 2011/0256874 A1 | 10/2011 | Hayama et al. |
| 2011/0291914 A1 | 12/2011 | Lewry et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvoid et al. |
| 2012/0139786 A1 | 6/2012 | Puzella et al. |
| 2012/0140651 A1 | 6/2012 | Nicoara et al. |

(56) References Cited

U.S. PATENT DOCUMENTS

| | | |
|---|---|---|
| 2012/0200449 A1 | 8/2012 | Bielas |
| 2012/0238201 A1 | 9/2012 | Du et al. |
| 2012/0263145 A1 | 10/2012 | Marinier et al. |
| 2012/0282868 A1 | 11/2012 | Hahn |
| 2012/0299789 A1 | 11/2012 | Orban et al. |
| 2012/0314634 A1 | 12/2012 | Sekhar |
| 2013/0003645 A1 | 1/2013 | Shapira et al. |
| 2013/0005350 A1 | 1/2013 | Campos et al. |
| 2013/0023216 A1 | 1/2013 | Moscibroda et al. |
| 2013/0044028 A1 | 2/2013 | Lea et al. |
| 2013/0063310 A1 | 3/2013 | Mak et al. |
| 2013/0064161 A1 | 3/2013 | Hedayat et al. |
| 2013/0082899 A1 | 4/2013 | Gomi |
| 2013/0095747 A1 | 4/2013 | Moslifeghi |
| 2013/0128858 A1 | 5/2013 | Zou et al. |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1 | 8/2013 | Li et al. |
| 2013/0234898 A1 | 9/2013 | Leung et al. |
| 2013/0271319 A1 | 10/2013 | Trerise |
| 2013/0286950 A1 | 10/2013 | Pu |
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1 | 1/2014 | Balbien et al. |
| 2014/0051357 A1 | 2/2014 | Steer et al. |
| 2014/0098748 A1 | 4/2014 | Chan et al. |
| 2014/0113676 A1 | 4/2014 | Hamalainen et al. |
| 2014/0145890 A1 | 5/2014 | Ramberg et al. |
| 2014/0154895 A1 | 6/2014 | Poulsen et al. |
| 2014/0185494 A1 | 7/2014 | Yang et al. |
| 2014/0191918 A1 | 7/2014 | Cheng et al. |
| 2014/0198867 A1 | 7/2014 | Sturkovich et al. |
| 2014/0206322 A1 | 7/2014 | Dimou et al. |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0240186 A1 | 8/2014 | Zhou et al. |
| 2014/0253378 A1 | 9/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0328238 A1 | 11/2014 | Seok et al. |
| 2014/0341013 A1 | 11/2014 | Kumar |
| 2014/0355578 A1 | 12/2014 | Fink et al. |
| 2014/0355584 A1 | 12/2014 | Fink et al. |
| 2015/0002335 A1 | 1/2015 | Hinman et al. |
| 2015/0002354 A1 | 1/2015 | Knowles |
| 2015/0015435 A1 | 1/2015 | Shen et al. |
| 2015/0116177 A1 | 4/2015 | Powell et al. |
| 2015/0156642 A1 | 6/2015 | Sobczak et al. |
| 2015/0215952 A1 | 7/2015 | Hinman et al. |
| 2015/0244077 A1 | 8/2015 | Sanford |
| 2015/0256213 A1* | 9/2015 | Jan .................. H04B 7/0602 370/338 |
| 2015/0256275 A1 | 9/2015 | Hinman et al. |
| 2015/0263816 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0119018 A1 | 4/2016 | Lindgren et al. |
| 2016/0149634 A1 | 5/2016 | Kalkunte et al. |
| 2016/0149635 A1 | 5/2016 | Hinman et al. |
| 2016/0211583 A1 | 7/2016 | Lee et al. |
| 2016/0240929 A1 | 8/2016 | Hinman et al. |
| 2016/0338076 A1 | 11/2016 | Hinman et al. |
| 2016/0365666 A1 | 12/2016 | Ramos et al. |
| 2016/0366601 A1 | 12/2016 | Hinman et al. |
| 2017/0048647 A1 | 2/2017 | Jung et al. |
| 2017/0201028 A1 | 7/2017 | Eberhardt et al. |
| 2017/0238151 A1 | 8/2017 | Fink et al. |
| 2017/0294975 A1 | 10/2017 | Hinman et al. |
| 2017/0353245 A1 | 12/2017 | Vardarajan et al. |
| 2018/0035317 A1 | 2/2018 | Hinman et al. |
| 2018/0083365 A1 | 3/2018 | Hinman et al. |
| 2018/0084563 A1 | 3/2018 | Hinman et al. |
| 2018/0102594 A1 | 4/2018 | Murdock et al. |
| 2018/0160353 A1 | 6/2018 | Hinman |
| 2018/0167105 A1 | 6/2018 | Vannucci et al. |
| 2018/0192305 A1 | 7/2018 | Hinman et al. |
| 2018/0199345 A1 | 7/2018 | Fink et al. |
| 2018/0241491 A1 | 8/2018 | Hinman et al. |
| 2019/0006789 A1 | 1/2019 | Ramos et al. |
| 2019/0115664 A1 | 4/2019 | Veihl et al. |
| 2019/0182686 A1 | 6/2019 | Hinman et al. |
| 2019/0214699 A1 | 7/2019 | Eberhardt et al. |
| 2019/0215745 A1 | 7/2019 | Hinman |
| 2019/0273326 A1 | 9/2019 | Sanford et al. |
| 2020/0015231 A1 | 1/2020 | Fink et al. |
| 2020/0036465 A1 | 1/2020 | Hinman et al. |
| 2020/0067164 A1 | 2/2020 | Eberhardt et al. |
| 2020/0083614 A1 | 3/2020 | Sanford et al. |
| 2021/0167510 A1 | 6/2021 | Hinman et al. |
| 2021/0167842 A1 | 6/2021 | Hinman et al. |
| 2021/0273346 A1 | 9/2021 | Sanford et al. |

FOREIGN PATENT DOCUMENTS

| | | |
|---|---|---|
| CN | 105191204 A | 12/2015 |
| CN | 105191204 B | 5/2019 |
| EM | 002640177 A1 | 2/2015 |
| EP | 1384285 B1 | 1/2004 |
| EP | 3208887 A1 | 2/2017 |
| EP | 3491697 A1 | 6/2019 |
| WO | WO2014137370 A1 | 9/2014 |
| WO | WO2014138292 A1 | 9/2014 |
| WO | WO2014193394 A1 | 12/2014 |
| WO | WO2015112627 A2 | 7/2015 |
| WO | WO2017123558 A1 | 7/2017 |
| WO | WO2018022526 A1 | 2/2018 |
| WO | WO2019136257 A1 | 7/2019 |
| WO | WO2019168800 A1 | 9/2019 |

OTHER PUBLICATIONS

International Search Report and Written Opinion of "International Search Report" and "Written Opinion of the International Search Authority," dated Nov. 26, 2013 in Patent Cooperation Treaty Application No. PCT/US2013/047406, filed Jun. 24, 2013, 9 pages.

"International Search Report" and "Written Opinion of the International Search Authority," dated Aug. 9, 2013 in Patent Cooperation Treaty Application No. PCT/US2013/043436, filed May 30, 2013, 13 pages.

"International Search Report" and "Written Opinion of the International Search Authority," dated Jul. 1, 2014 in Patent Cooperation Treaty Application No. PCT/US2014/020880, filed Mar. 5, 2014, 14 pages.

"International Search Report" and "Written Opinion of the International Search Authority," dated Jun. 29, 2015 in Patent Cooperation Treaty Application No. PCT/US2015/012285, filed Jan. 21, 2015, 15 pages.

Hinman et al., U.S. Appl. No. 61/774,632, filed Mar. 7, 2013, 23 pages.

Office Action dated Jun. 15, 2015 in Chinese Design Patent Application 201530058063.8, filed Mar. 11, 2015, 1 page.

Notice of Allowance dated Sep. 8, 2015 in Chinese Design Patent Application 201530058063.8, filed Mar. 11, 2015, 3 pages.

Weisstein, Eric, "Electric Polarization", Wolfram Reasearch [online], Retrieved from the Internet [retrieved Mar. 23, 2017] <URL:http://scienceworld.wolfram.com/physics/ElectricPolarization.html>, 2007, 1 page.

Liu, Lingjia et al., "Downlink MIMO in LTE-Advanced: SU-MIMO vs. MU-MIMO," IEEE Communications Magazine, Feb. 2012, pp. 140-147.

(56) References Cited

OTHER PUBLICATIONS

"International Search Report" and "Written Opinion of the International Searching Authority," Patent Cooperation Treaty Application No. PCT/US2017/012884, dated Apr. 6, 2017, 9 pages.
"Office Action," Chinese Patent Application No. 201580000078.6, dated Nov. 3, 2017, 5 pages [10 pages including translation].
"International Search Report" and "Written Opinion of the International Searching Authority," Patent Cooperation Treaty Application No. PCT/US2017/043560, dated Nov. 16, 2017, 11 pages.
"Office Action," Chinese Patent Application No. 201580000078.6, dated Jul. 30, 2018, 5 pages [11 pages including translation].
"Office Action," Chinese Patent Application No. 201580000078.6, dated Oct. 31,2 018, 3 pages [6 pages including translation].
"Notice of Allowance," Chinese Patent Application No. 201580000078.6, dated Feb. 11, 2019, 2 pages [4 pages including translation].
"International Search Report" and "Written Opinion of the International Search Authority," dated Mar. 22, 2019 in Patent Cooperation Treaty Application No. PCT/US2019/012358, filed Jan. 4, 2019, 9 pages.
FCC Regulations, 47 CFR § 15.407, 63 FR 40836, Jul. 31, 1998, as amended at 69 FR 2687, Jan. 20, 2004; 69 FR 54036, Sep. 7, 2004; pp. 843-846.
"International Search Report" and "Written Opinion of the International Search Authority," dated May 23, 2019 in Patent Cooperation Treaty Application No. PCT/US2019/019462, filed Feb. 25, 2019, 8 pages.
Teshirogi, Tasuku et al., "Wideband Circularly Polarized Array Antenna with Sequential Rotations and Phase Shift of Elements," Proceedings of the International Symposium on Antennas and Propagation, 1985, pp. 117-120.
"Sector Antennas," Radiowaves.com, [online], [retrieved Oct. 10, 2019], Retrieved from the Internet: <URL:https://www.radiowaves.com/en/products/sector-antennas>, 4 pages.
XP Performance Antennas Search Results for Antennas, Sector, Single, [online], KPPerformance.com [retrieved Oct. 10, 2019], Retrieved from the Internet: <URL:https://www.kpperformance.com/search?Category=Antennas&Rfpsan99design=Sector&Rfpsan99option=Single&view_type=grid>, 6 pages.
"Partial Supplemental European Search Report," European Patent Application No. 17835073.2, dated Feb. 13, 2020, 17 pages.
"Wireless Access Point," Wikipedia.org, Jan. 6, 2020 [retrieved on Feb. 3, 2020], Retrieved from the Internet: <https://en.wikipedia.org/wiki/Wireless_access_point>, 5 pages.
"Extended European Search Report", European Patent Application No. 17835073.2, dated Jun. 30, 2020, 15 pages.
Haupt, R.T., "Antenna Arrays: A Computational Approach", Chapter 5: Non-Planar Arrays; Wiley-IEEE Press (2010), pp. 287-338.
"Office Action", European Patent Application No. 17835073.2, dated Jun. 1, 2021, 10 pages.

* cited by examiner

MULTI-BAND ACCESS POINT ANTENNA ARRAY

CROSS REFERENCE TO RELATED APPLICATIONS

This application claims the benefit and priority of U.S. Provisional Application Ser. No. 62/368,946, filed on Jul. 29, 2016, which is hereby incorporated by reference herein including all references and appendices cited therein.

FIELD OF THE INVENTION

The present disclosure pertains to multi-band antenna arrays, and more specifically, but not by limitation to multi-band antenna arrays that can be incorporated into an access point, comprising groups of antennas vertically arranged onto a multi-faceted chassis, while providing 360-degree coverage and reduction in an elevation beam width of the multi-band antenna array.

SUMMARY

In one aspect, the present disclosure is directed to a multi-band antenna array, comprising: (a) vertical surfaces arranged into a tubular configuration, each of the vertical surfaces comprising antenna arrays aligned along the surfaces, the antenna elements being arrayed through a feed network in such a way that antenna gain is increased through beam-forming, while elevation beam-width is reduced; and (b) two or more radios connected to the antenna arrays on the vertical surfaces via the feed network.

In another aspect, the present disclosure is directed to a multi-band antenna array, comprising: (a) a tubular body comprised of a plurality of ground plane substrates which have been arranged into a geometrical configuration; (b) antenna arrays associated with the plurality of ground plane substrates, the antenna elements being arrayed together in-phase so that an elevation beam-width has a fixed electrical downtilt relative to a substantially horizontal reference plane; and (c) two or more radios connected to the antenna arrays on the plurality of ground plane substrates via the feed network.

In another aspect, the present disclosure is directed to a multi-band antenna array, comprising: (a) antenna arrays that each comprise vertically arranged antenna elements spaced apart from one another to increase antenna gain, the antenna arrays being coupled together in such a way that elevation beam-width is optimized through beamforming; and (b) at least one radio electrically coupled with the antenna arrays.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
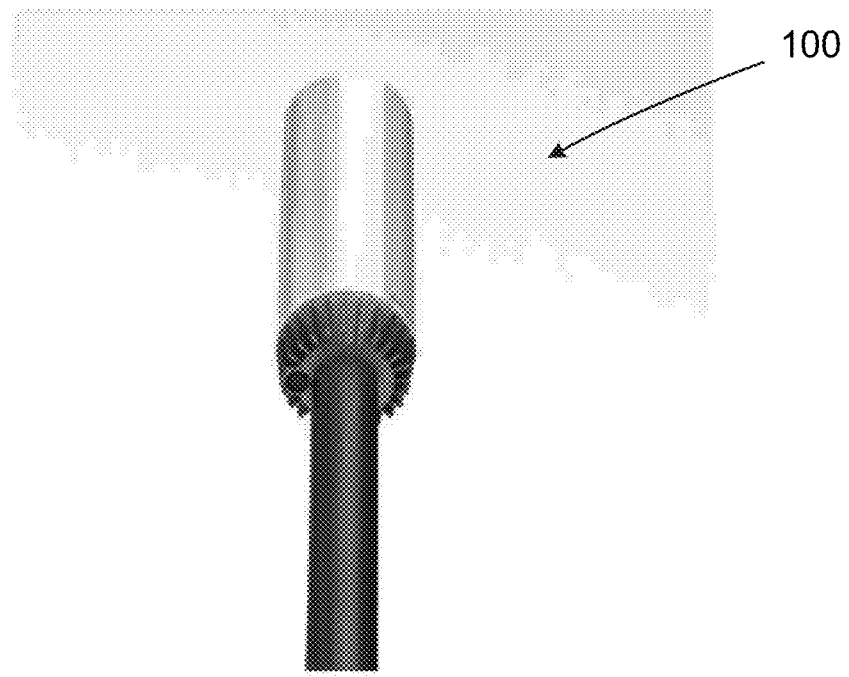
FIG. 1 is a perspective view of an example multi-band antenna array device 100, constructed in accordance with the present disclosure.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

There is an increasing trend to deploy Wi-Fi access points that operate concurrently on two bands, typically 2.4 GHz and 5 GHz. Operating on two bands increases the throughput and number of clients supported by an access point. It also creates the possibility of offering hotspot service on one band (e.g. 2.4 GHz), while offering fixed service on the other band (e.g. 5 GHz). Improving the range for which access points can communicate with low-gain clients, such as mobile devices and tablets, requires a combination of physical and processed antenna gain. This is becoming more important as Wi-Fi moves from predominantly indoor deployments to outdoor deployments, blanketing entire cities with Wi-Fi connectivity. Physical antenna gain is often achieved by arraying a set of antenna elements together, increasing the directionality of the array. The tradeoff of employing antenna arrays is limiting the directionality to a more narrow angular range. As a general observation, humans tend to live and work within a narrow elevation angle relative to the surface of the earth. Thus, it's often practical to create vertical arrays of antenna elements, which has the effect of increasing the gain of the array, while reducing the elevation beam-width. Cellular antenna panels, as an example, have been designed as arrays of vertical elements for many years.

Generally speaking, indoor dual-band Wi-Fi access points today use individual elements connected to a multiplicity of chains on a MIMO radio. 3×3 and 4×4 MIMO chipsets are quite common today. A typical dual-band access point would have three antenna elements connected to the three chains of a 3×3 MIMO radio at 2.4 GHz, and another three antenna elements connected to the three chains of another 3×3 MIMO radio at 5 GHz. For products not having external "stick" antennas, manufacturers have tended to solder bent metal antenna elements into a shared printed circuit board, producing an access point with a low vertical profile. While attractive when mounted on a ceiling, for example, such designs inherently have low antenna gain, as the effective projected surface area is not maximized in the direction of transmission and reception. It's generally recognized that access points with external antennas perform better. The reason is that each antenna typically has 5 dBi of gain in the horizontal plane when oriented vertically, and MIMO radios employ beam-forming to electronically array the antennas to improve the processed antenna gain through real-time adaptation. Access points with external stick antennas are generally considered less attractive than access points with antennas integrated with the electronics though. Ironically, the superior performance of access points with external antennas is defeated by installing the devices in out-of-sight locations, such as in a cabinet.

Outdoor Wi-Fi is less popular than indoor Wi-Fi today. Typical use cases include Wi-Fi and Wi-Fi-derived radios for fixed access, and Wi-Fi access points in large venue and hospitality applications. In the latter case, the products deployed are often weatherized versions of those found in indoor applications.

While weatherizing an indoor access point for outdoor use is not ideal from an antenna gain perspective, Wi-Fi access point vendors have not considered the market potential to be large enough to warrant an outdoor-optimized design. In the case of fixed access, however, manufacturers have had to address the antenna gain issue; else the link budget would not be sufficient to maintain connectivity over long distances. For point-to-point fixed wireless links, parabolic antennas have become the norm, increasing the antenna gain in a "pencil beam" at both ends of the link to overcome the free-space-path-loss. For point-to-multipoint fixed wireless applications, manufacturers have followed the model of the cellular industry.

"Sector antennas" are typically formed using a vertical array of antenna elements placed over a metallic ground plane. The resulting antennas, often using two polarizations, have a relatively narrow elevation beam-width, while maintaining the azimuthal beam-width as 60, 90, or 120 degrees, typically.

Recent access points have become available that integrate four arrays operating at 5 GHz, with each of the four arrays covering a different 90-degree quadrant, creating an effective 360-degree pickup pattern. Operating a cluster of such arrays with a 4×4 MIMO radio means that one array plays a dominant role while communicating with a client in one direction, while another array plays a dominant role while communicating with another client in a different direction. Ignoring the arrays with little or no signal present allows the MIMO radio to take advantage of the antenna gain afforded by a single array covering a 90-degree angle.

Figure 2:
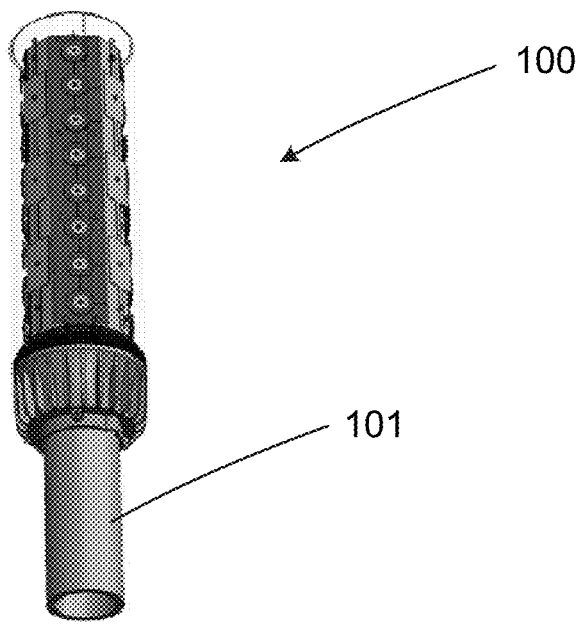
FIG. 2 is a front elevational view of the example multi-band antenna array device of FIG. 1.

FIG. 1 is a perspective view of an example multi-band antenna array device 100 (multi-band access point) mounted on a support structure such as a mounting pole 101. FIG. 2 is a front elevation view of the multi-band antenna array device 100.

To create a multi-band access point with minimal cross-sectional area, capable of communicating with clients over 360 degrees, generally in the horizontal plane of the Earth, the multi-band antenna array device 100 comprises an array of eight antenna arrays, clustered vertically around an octagonal form. Each of the antenna arrays consists of individual antenna elements, arranged vertically, connected through a "corporate feed," series feed, or combination thereof. The antenna elements may be single or dual-polarization, using linear (e.g. vertical/horizontal, or slant 45 degrees) or circular polarization techniques. The antenna elements are generally placed over a metallic ground plane, which has the effect of creating directivity, limiting the pattern to approximately 90 degrees in the azimuthal direction. Alternating faces of the cluster serve a particular band of operation. For example, if the array on a regular octagonal form pointing toward the North operates in the 2.4 GHz band, then the arrays pointing Northeast, Southeast, Southwest and Northwest would be dedicated to the 5 GHz band, while the North, East, South and West faces would serve the 2.4 GHz band.

The faces of the octagon need not have the same width, as the ground plane for a lower frequency band may need to be wider than the ground plane for the higher frequency band. Moreover, the angles between the arrays may not be separated by 45 degrees. In the extreme, the arrays of two different bands may share a common surface, forming a square form rather than an octagonal form. This is generally less desirable though, as the maximum diameter of the array will increase in a square form relative to an octagonal form.

For the case of an integrated access point, whereby the electronics and antenna cluster share a common enclosure, it will be desirable to mount the electronics inside the form of the octagonal structure, as this would otherwise be an empty volume. Cables would extend from the electronics board to each of the eight antenna arrays. The dual-band antenna array may support a total of eight chains, 12 chains, or 16 chains, depending upon the MIMO radio employed. Each array servicing a 90-degree azimuthal pattern can be either single or dual polarization. The combinations would be four chains on both bands (single polarization in each array), both permutations of four chains on one band and eight chains on the other band, and eight chains on both bands (dual polarization in each array).

Figure 3:
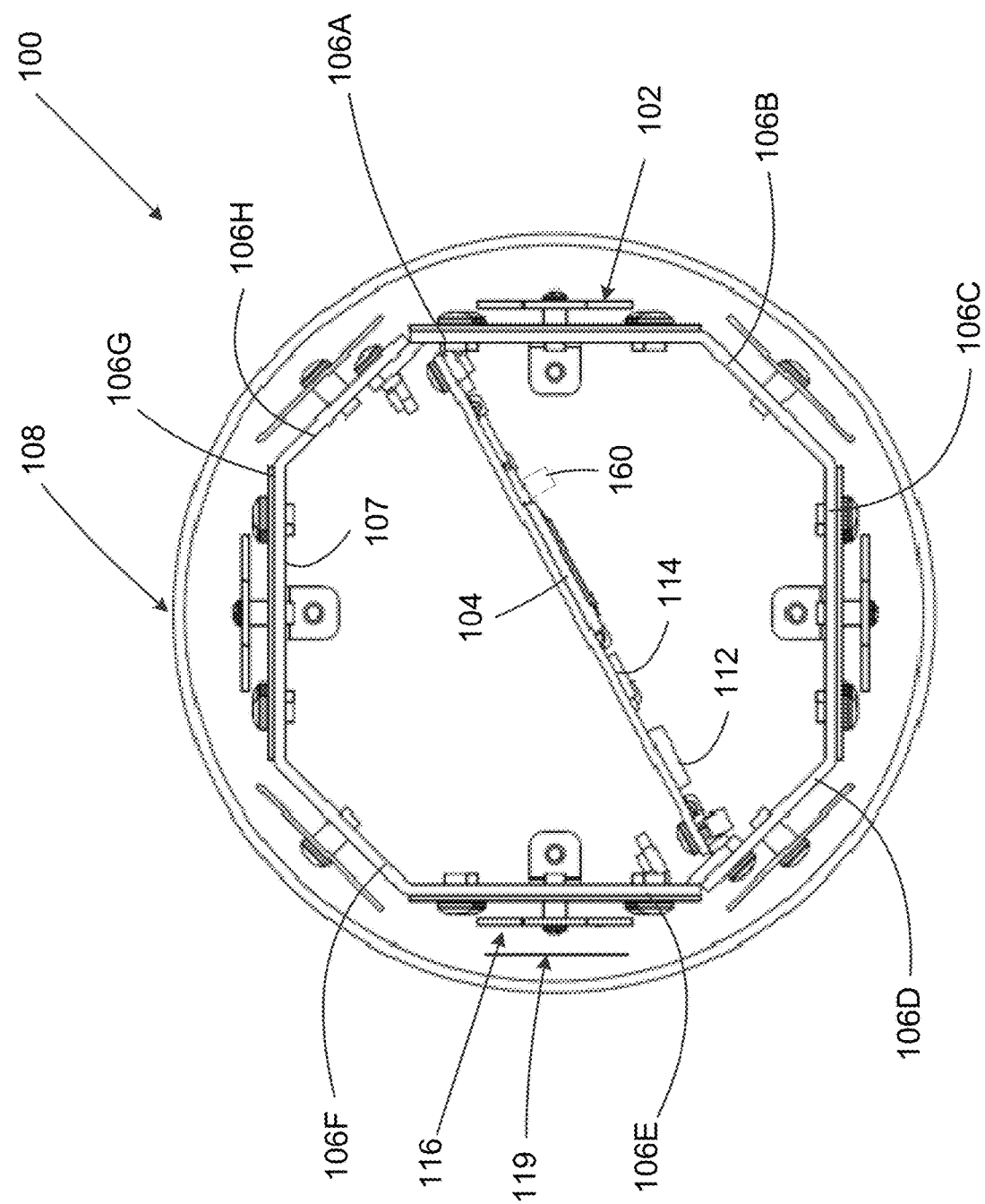
FIG. 3 is a top down cross-sectional view of the example multi-band antenna array device.

FIG. 3 is a cross-sectional view of the example multi-band antenna array device 100, constructed in accordance with the present disclosure. Namely, the multi-band antenna array device 100 illustrated in FIG. 3 comprises an octagonal grouping of antenna arrays 102 and radio board 104. The octagonal grouping of antenna arrays 102 is comprised of eight ground plane substrates 106A-H (referred to as ground plane surfaces or vertical surfaces in some examples) that are joined together to form a generally octagonal tubular member. To be sure, the octagonal grouping of antenna arrays 102 can have additional or fewer surfaces creating tubular members of varying cross sections such as decagon, square, pentagonal, or other polygonal shapes.

The ground plane substrates 106A-H are supported by (e.g., mounted on) a chassis 107 that can be constructed from any suitable material that would be known to one of ordinary skill in the art with the present disclosure before them.

In one or more embodiments, ground plane substrates 106A, 106C, 106E, and 106G are each associated with 5 GHz antennas and ground plane substrates 106B, 106D, 106F, and 106H are each associated with 2.4 GHz antennas. Each of the ground plane substrates has a thickness that can vary according to design requirements. The ground plane substrates are constructed from any suitable material that would be known to one of ordinary skill in the art with the present disclosure before them.

Additionally, the ground plane substrates 106A, 106C, 106E, and 106G comprise a first width and the ground plane substrates 106B, 106D, 106F, and 106H comprise a second width. In one embodiment the first width is greater than the second width. In another embodiment the first width and second width are substantially similar in size relative to one another.

The ground plane substrates 106A, 106C, 106E, and 106G are disposed alternately with the ground plane substrates 106B, 106D, 106F, and 106H. For example, ground plane substrate 106B is disposed between ground plane substrates 106A and 106C.

The ground plane substrates 106A, 106C, 106E, and 106G are disposed in parallel or perpendicularly to one another. For example, ground plane substrate 106A and ground plane substrate 106C are perpendicular to one another and ground plane substrates 106A and 106E are disposed parallel to one another.

Each of the ground plane substrates 106A-H comprises antenna elements. Additional details regarding the antenna elements are described and illustrated with reference to FIG. 4.

The radio board 104 comprises one or more radios, such as radios 112 and 114. The radio board 104 is disposed within the octagonal grouping of antenna arrays 102, in one embodiment.

In one embodiment the radio 112 is a 5 GHz radio and the radio 114 is a 2.4 GHz antenna. The antennas associated with ground plane substrates 106A, 106C, 106E, and 106G are coupled to the 5 GHz radio 112 and the antennas associated with ground plane substrates 106B, 106D, 106F, and 106H are coupled to the 2.4 GHz radio 114. This octagonal configuration having at least eight ground plane substrates allows for 8×8 MIMO (multiple input multiple output) operation at 5 GHz when dual-polarization is used on four quadrants. Single polarization on each of the 2.4 GHz quadrants provides 4×4 MIMO operation.

The example multi-band antenna array device 100 comprises a shroud or housing 108 that surrounds the octagonal grouping of antenna arrays 102 and radio board 104.

The multi-band antenna array device 100 is series fed set of patch antennas, which results in reduced operating bandwidth because the phase is dependent upon the propagation time from one element to the next. In a corporate feed, a tree is formed that equalizes the time to each element, which eliminates a phase misalignment over frequency. In the 2.4 GHz Wi-Fi band, the total operating bandwidth is only 4% of a band center frequency, while in the 5 GHz band, a total operating bandwidth is 13% of the band center frequency. Consequently, corporate feeds are appropriate for the 5 GHz band, while either corporate or series feeds can be used for the 2.4 GHz band. The advantage of the series feed in this particular instance is that it occupies less ground plane width, allowing the overall octagonal form to be as small as possible.

A feed network 116 is located within the housing 108 and is electrically coupled to the radio board. The antenna elements of each of the ground plane substrates 106A-H are arrayed through the feed network 116 in such a way that the antenna gain of the antenna arrays is increased while the elevation beam-width produced by the antenna arrays is reduced. In some embodiments, the feed network 116 is spaced apart from surface 106F, although the feed network 116 can be positioned in other locations within the example multi-band antenna array device 100.

In one embodiment, the elements of the antennas are arrayed using a fixed network of interconnect. In one embodiment, the fixed network of interconnect comprises a corporate feed where the lines connecting the elements receive signals at approximately the same time. In another embodiment, the interconnect can comprise series alignment over 360 degrees, which results in a frequency dependent configuration.

Also, in some embodiments antenna elements can be configured in-phase. In general, a vertical array of elements is pointed perpendicularly to a reference plane, such as the horizon. When wire lengths interconnecting elements (such as in a corporate feed) are equal, there is in-phase alignment of signals received from near the horizon, which gives rise to constructive interference at a terminal end of the corporate feed.

The introduction of an electrical downtilt in the device reduces the constructive interference.

The example multi-band antenna array device 100 can also comprise a 5 GHz parasitic patch 119 that is disposed proximate to one of the 5 GHz surfaces, such as surface 106E. Parasitic elements are placed above a driven patch element, which is typically mounted on a low-loss substrate over a ground-plane. The parasitic elements improve the efficiency and bandwidth of a patch antenna. A suitable example of this arrangement is disclosed in U.S. Pat. No. 4,835,538, which is hereby incorporated by reference here in its entirety, including all references cited therein.

Figure 4:
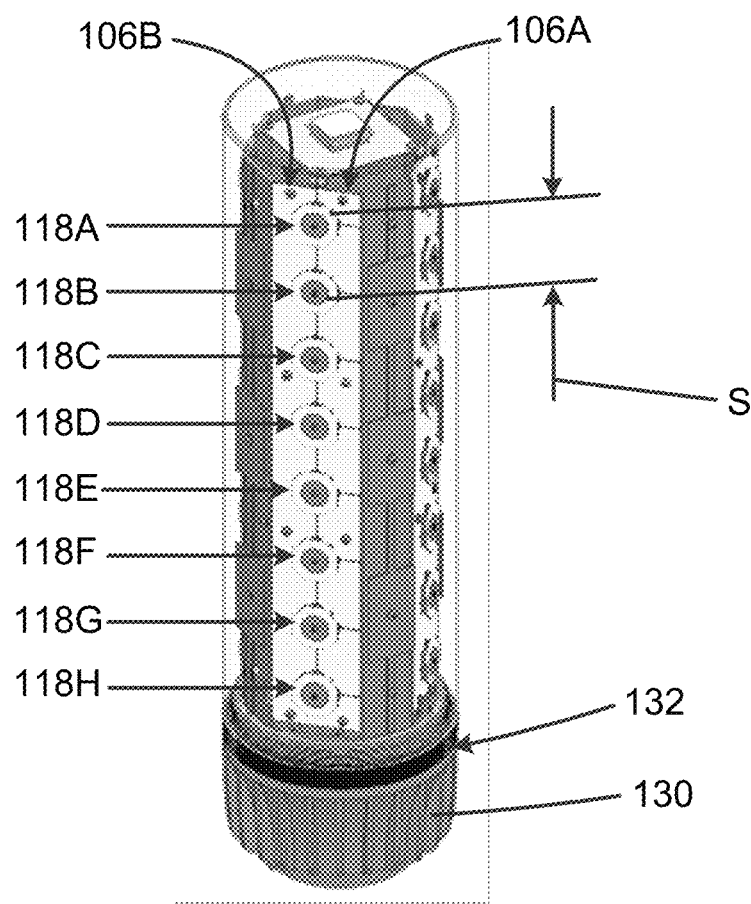
FIG. 4 is a perspective view of the example multi-band antenna array device, illustrating vertically arranged antenna elements.

In FIG. 4 the example multi-band antenna array device 100 is illustrated with three surfaces, surface 106A, 106B, and 106C. The surfaces 106A and 106C each comprise a plurality of antenna elements, such as elements 118A-H. Surface 106A comprises antenna elements 120A-F. In one embodiment, adjacent ones of the elements 118A-H are spaced apart from one another to effectuate the elevation beam crushing features of the present disclosure, as described in greater detail infra.

The vertical orientation of elements 118A-H and antenna elements 120A-F functions to increase antenna gain. A vertically arranged antenna array provides a benefit of crushing an elevation pattern of the multi-band antenna array device 100. For example, in a device with a single element, the single element will have an elevation beam width of approximately +/−45 degrees and an azimuth angle width of +/−45 degrees. The multi-band antenna array devices of the present disclosure comprise elements that are vertically arranged together and disposed in spaced apart relationship to one another. In one embodiment the spacing between adjacent antenna elements, such as spacing S between elements 118A and 118B, is approximately 0.8 of a lambda. Other spacings can be utilized in accordance with the present disclosure. In general, element-to-element spacing can vary between 0.7 and 0.85 lambda, depending upon the number of elements and designer discretion. Other spacings are likewise contemplated for use based on the desired antenna gain and/or desired elevation beam width.

In some embodiments, antenna elements are connected together in-phase such that the elevation beam width of this combination is reduced from +/−45 degrees to approximately +/−22.5 degrees. When a pair of two elements (four elements total on a vertical surface in some embodiments) are vertically arranged together so that adjacent elements are spaced apart from one another and connected together in-phase (e.g., corporate feed), the elevation beam width of this combination is reduced from +/−22.5 degrees to approximately +/−11.25 degrees. Again, this compression or crushing of the elevation beam width allows the device to have a 360 degree coverage area but broadcast along a more narrow elevation beam width where the vast majority of clients (referred to as user equipment or "UEs") are located, as mentioned above. In one embodiment the elevation beam width is +/−11.25 degrees relative to a horizontal axis, which can comprise a horizon of the Earth in a given location where the device is installed. These and other advantages of the present disclosure are described in greater detail with reference to the collective drawings.

As mentioned above, the multi-band antenna array device 100 can comprise a downtilt circuit that, in some embodiments, comprises a switched capacitor filter 160 that is capable of inducing any of a phase shift and phase delay, which are selectable by the user.

The multi-band antenna array device 100 also comprises a cooling assembly 130 that comprises a cylindrical heat sink that comprises a plurality of fins that provide efficient heat transfer to the ambient surroundings. In some embodiments, the cooling assembly 130 is configured to couple with a mounting pole, such as the mounting pole 101 (see FIG. 1). Cooling assemblies can be placed on either terminal end of the housing.

Also, the multi-band antenna array device 100 can comprise a lighting ring 132 that is disposed around a lower portion of the antenna arrays and above the cooling assembly 130. The lighting ring 132 illuminates when the multi-band antenna array device 100 is active. The lighting ring 132 can illuminate with different colors depending on the operational status of the multi-band antenna array device 100.

Figure 5:
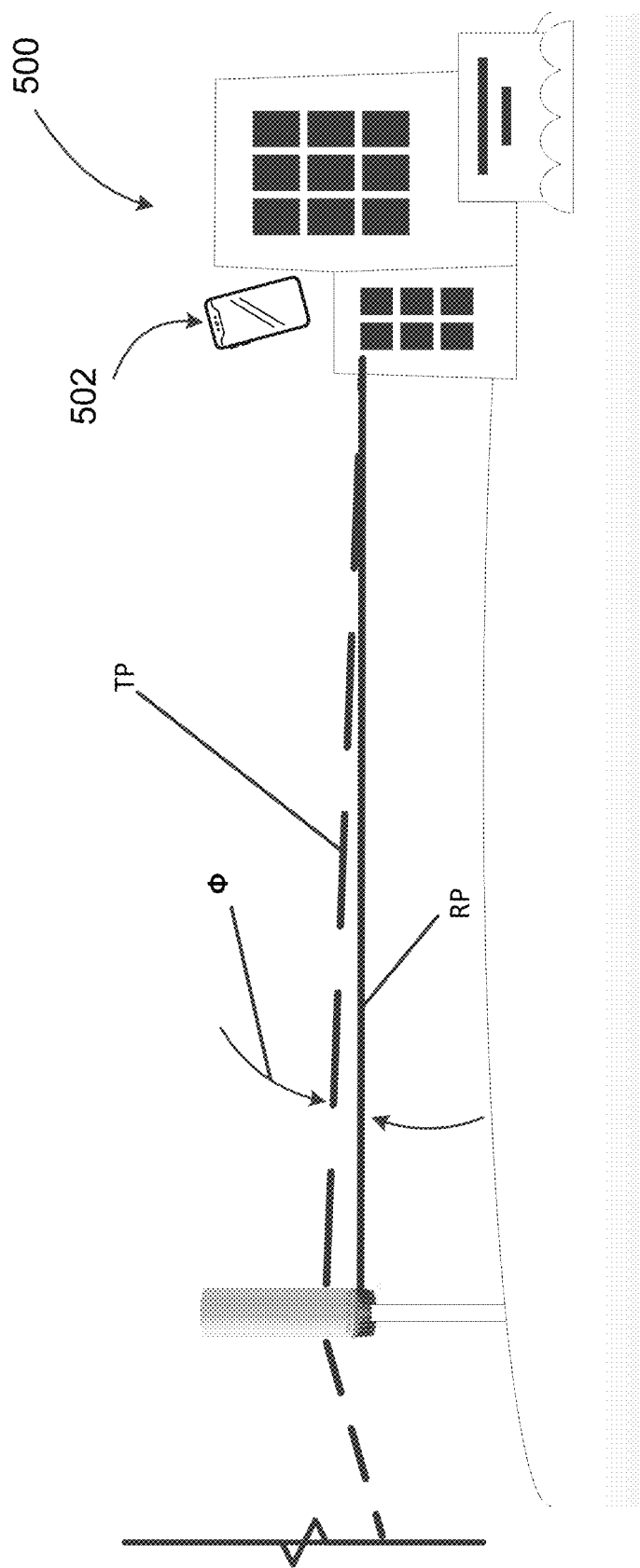
FIG. 5 is a schematic diagram of an example use case illustrating deployment of an example multi-band antenna array device and different elevation beam widths.

FIG. 5 illustrates an example use case of the present disclosure. A multi-band antenna array device 100 is located in a broadcast area 500. The broadcast area 500 comprises a plurality of UE devices 502. The broadcast area 500 can comprise a city, a portion of a city, or other geographical area where wireless services are deployed. The multi-band antenna array device 100 broadcasts in a substantially 360 degree pattern although only a portion of the broadcast pattern is illustrated in the side elevation view of FIG. 5. In one embodiment a target broadcast elevation for the multi-band antenna array device 100 is defined relative to a substantially horizontal reference plane RP, which is approximately zero degrees. The substantially horizontal reference plane RP is defined relative to a horizon of the Earth local to the multi-band antenna array device 100 and its broadcast area 500.

The multi-band antenna array device 100 can be positioned in any desired location within (or away from) the broadcast area 500.

With multiple arrays on a tubular surface as with the multi-band antenna array device 100 it is difficult to mechanically tilt an array toward users at ground level, because this would tilt the arrays up on the opposite side.

To beam from or direct the multi-band antenna array device 100 at a given angle, the multi-band antenna array device 100 can incorporate aspects of an electrical downtilt, so that an access point mounted in a high place can have gain tilted toward the ground.

In one embodiment, the electrical downtilt is fixed in its angular orientation relative to a reference plane. For example, a processor can introduce or cause a staggering of timing of alignment of elements through a corporate feed as described above. Antenna gain is maximized while the electrical downtilt can be set, for example, at two degrees relative to a reference plane that is zero degrees. This is merely an example, and the electrical downtilt can be any desired angle. In some instances the tilt can include an uptilt rather than a downtilt.

As mentioned above, the multi-band antenna array device 100 can include a means for dynamic or selective adjustment of downtilt angle by using a downtilt circuit. An example of a suitable circuit includes a switched capacitor that induces any of a phase shift and phase delay, which are selectable by the user.

Thus, in FIG. 5, a transceive plane TP is illustrated that has an electrical downtilt angle $\phi$ of approximately two degrees relative to the reference plane RP.

Figure 6:
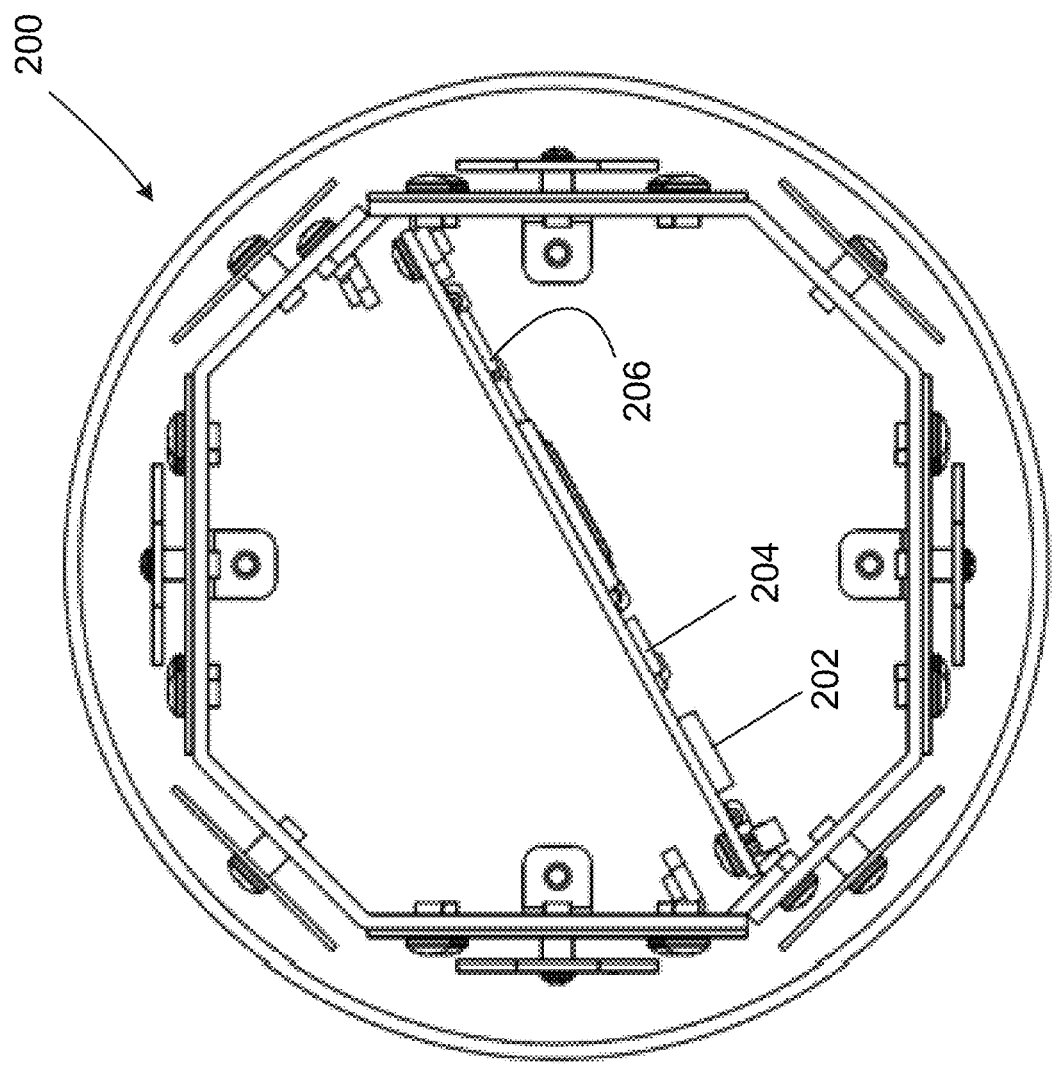
FIG. 6 is a top down cross-sectional view of another example multi-band antenna array device.

FIG. 6 illustrates another example multi-band antenna array device 200 that comprises a first radio 202, a second radio 204, and a third radio 206. In one embodiment the first radio 202 operates on a 2.4 GHz band. The second radio 204 operates on an upper portion of the 5 GHz band, and the third radio 206 operates on a lower portion of the 5 GHz band.

Figure 7:
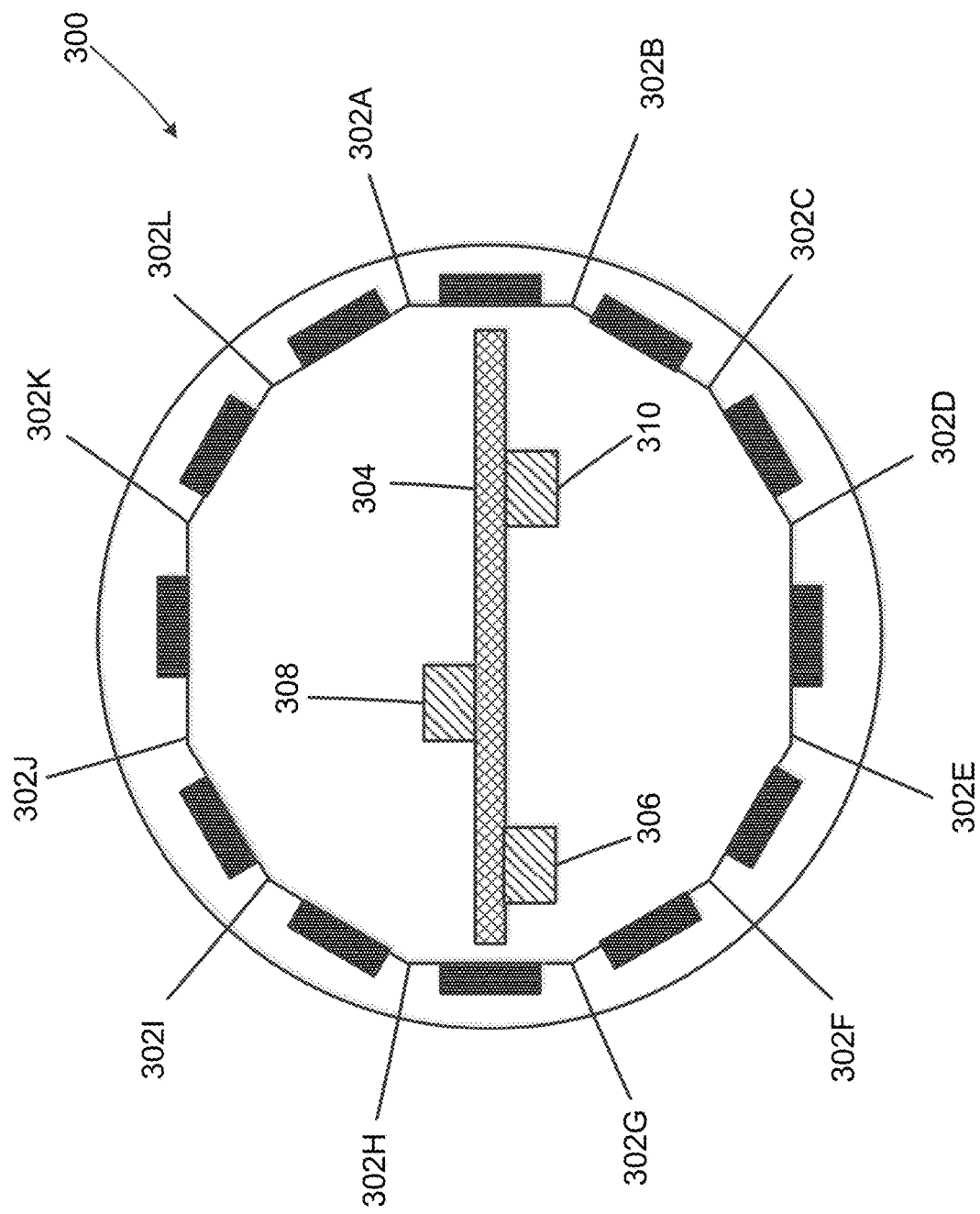
FIG. 7 is a top down cross-sectional view of yet another example multi-band antenna array device.

FIG. 7 illustrates another example multi-band antenna array device 300 that comprises a dodecagon grouping of ground plane substrates 302A-L, each comprising antenna elements. The device 300 also comprises a radio board 304 that comprises three radios. A first radio 306 operates on a 2.4 GHz band. A second radio 308 operates on a 5 GHz band. A third radio 310 operates on the 3.5 GHz band. In one embodiment the ground plane substrates 302A-L are arranged in an alternating pattern such that ground plane substrate 302A is coupled with the first radio 306, ground plane substrate 302B is coupled with the second radio 308, and ground plane substrate 302C is coupled with the third radio 310, and so forth.

Some embodiments above have disclosed a cylindrical shaped housing that encloses geometrically arranged substrates that receive antenna elements. These geometrically arranged substrates have been illustrated as being substantially vertical or perpendicular to a ground plane. Other embodiments allow for conical arrangements of geometrically arranged substrates where the substrates angle upwardly, or in other embodiments angle downwardly. A downward angled conical shape would allow for the device to transceive signals downwardly without requiring electrical downtilt. An upwardly angled conical shape would allow for the device to transceive signals upwardly requiring electrical uptilt, although some degree of tilt can be used in these embodiments as well if the physical shape is not enough to produce a desired angle of operation. Other geometrical configurations are likewise contemplated.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A multi-band antenna array, comprising:
vertical surfaces arranged in a tubular configuration, each of the vertical surfaces comprising an antenna array aligned along the vertical surfaces, the antenna arrays comprising vertically arranged antenna elements, the antenna elements being arrayed through a feed network, wherein a first portion of the antenna elements are used to broadcast in a 5 GHz band, the first portion being coupled to a corporate feed and a second portion of the antenna elements are used to broadcast in a 2.4 GHz band, the second portion being connected to a series feed, wherein the antenna elements are spaced apart from one another to increase antenna gain of the antenna arrays relative to a single antenna element, the first portion of the antenna elements being arrayed together in-phase so that an elevation beam-width has a fixed electrical downtilt relative to a substantially horizontal reference plane that corresponds to a horizon of the Earth; and
three radios coupled to the antenna arrays on the vertical surfaces via the feed network, said three radios comprise a first radio that operates on a 2.4 GHz band for the second portion of the antenna elements, a second radio that operates on a 5 GHz band for the first portion of the antenna elements, and a third radio that operates on 3.5 GHz band.

2. The multi-band antenna array according to claim 1, further comprising a chassis, wherein the antenna arrays are mounted onto the chassis.

3. The multi-band antenna array according to claim 1, further comprising a cylindrical housing that surrounds the antenna arrays.

4. The multi-band antenna array according to claim 1, further comprising a radio board that comprises at least one of the three radios, the radio board being disposed inside a chassis.

5. The multi-band antenna array according to claim 4, further comprising a housing that surrounds the antenna arrays and the radio board.

6. The multi-band antenna array according to claim 1, further comprising at least eight ground plane substrates that comprise the antenna arrays.

7. The multi-band antenna array according to claim 6, wherein the at least eight ground plane substrates are joined together to form an octagonal tubular member.

8. The multi-band antenna array according to claim 6, wherein a first portion of the at least eight ground plane substrates comprises a first width and a second portion of the at least eight ground plane substrates comprises a second width.

9. The multi-band antenna array according to claim 8, wherein the first portion of the at least eight ground plane substrates are disposed alternatingly with the second portion of the at least eight ground plane substrates.

10. The multi-band antenna array according to claim 6, wherein a portion of the at least eight ground plane substrates are disposed in parallel or perpendicularly to one another.

11. The multi-band antenna array according to claim 1, further comprising a cylindrical cooling assembly associated with a terminal end of a cylindrical housing that covers the antenna arrays, the antenna arrays being mounted onto the cylindrical cooling assembly.

12. The multi-band antenna array according to claim 11, wherein the cylindrical cooling assembly is configured to couple with a mounting pole for mounting the multi-band antenna array in a vertical orientation.

13. The multi-band antenna array according to claim 11, further comprising a lighting ring coupled with the cylindrical housing, the lighting ring displaying activated when the multi-band antenna array is functioning.

14. The multi-band antenna array according to claim 13, wherein the lighting ring illuminates with different colors depending on an operational status of the multi-band antenna array.

15. The multi-band antenna array according to claim 1, wherein the fixed electrical downtilt in the multi-band antenna array reduces constructive interference at a terminal end of the feed network.

16. The multi-band antenna array according to claim 1, wherein the antenna elements are arrayed together in-phase such that the elevation beam-width is reduced from +/−45 degrees to approximately +/−22.5 degrees.

17. The multi-band antenna array according to claim 1, wherein the elevation beam-width is +/−11.25 degrees relative to a horizontal axis, which comprises the horizon of the Earth at a location where the multi-band antenna array is installed.

18. The multi-band antenna array according to claim 1, wherein a reduction of the elevation beam-width allows the multi-band antenna array to have a 360 degree coverage area while broadcasting along a more narrow elevation beam width where clients are located.

19. The multi-band antenna array according to claim 18, wherein the clients comprise user equipment.

20. The multi-band antenna array according to claim 18, wherein the antenna arrays comprise 5 GHz antenna arrays and an elevation beam width of the 5 GHz antenna arrays is approximately +/−5 degrees relative to the reference plane that is zero degrees.

* * * * *